(12) United States Patent
Moto et al.

(10) Patent No.: US 10,541,592 B2
(45) Date of Patent: Jan. 21, 2020

(54) ELECTROMAGNETIC DRIVING MODULE AND LENS DRIVING DEVICE USING THE SAME

(71) Applicant: TDK TAIWAN CORP., Yangmei Taoyuan (TW)

(72) Inventors: Ichitai Moto, Yangmei Taoyuan (TW); Shih-Ting Huang, Yangmei Taoyuan (TW); Kuo-Chun Kao, Yangmei Taoyuan (TW); Yu-Huai Liao, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 90 days.

(21) Appl. No.: 15/420,870

(22) Filed: Jan. 31, 2017

(65) Prior Publication Data
US 2017/0229950 A1  Aug. 10, 2017

(30) Foreign Application Priority Data

Feb. 5, 2016  (TW) .............................. 105103986 A

(51) Int. Cl.
*G02B 27/64* (2006.01)
*G02B 7/02* (2006.01)
*H02K 33/02* (2006.01)

(52) U.S. Cl.
CPC ............. *H02K 33/02* (2013.01); *G02B 7/023* (2013.01); *G02B 27/646* (2013.01)

(58) Field of Classification Search
CPC . G02B 7/00; G02B 7/003; G02B 7/02; G02B 7/021; G02B 7/023; G02B 7/028;
(Continued)

(56) References Cited

U.S. PATENT DOCUMENTS

| 8,849,106 B1* | 9/2014 | Kokichi | ............... | H04N 5/2328 |
| | | | | 396/55 |
| 2012/0229901 A1* | 9/2012 | Moriya | .................... | G03B 3/10 |
| | | | | 359/557 |

(Continued)

FOREIGN PATENT DOCUMENTS

| CN | 101551507 A | 10/2009 |
| CN | 102955324 A | 3/2013 |

(Continued)

OTHER PUBLICATIONS

Chinese Office Action in application No. 201610507074.3 dated Apr. 15, 2019; pp. 1-6.

*Primary Examiner* — Thong Q Nguyen
(74) *Attorney, Agent, or Firm* — Muncy, Geissler, Olds & Lowe, P.C.

(57) ABSTRACT

An electromagnetic driving device is provided, which includes a stationary member, an OIS driving circuit, a movable member, and a protection member. The OIS driving coil is disposed on the stationary member. The movable member is disposed in the stationary member and includes a frame and a magnetic element. The frame surrounds a main axis. The magnetic element is disposed on the frame and faces the OIS driving coil in a direction that is parallel to the main axis. The protection element is disposed on a side of the magnetic element that is away from the main axis and is in contact with the magnetic element. In addition, in a direction that is perpendicular to the main axis, the protection element faces the stationary member and is spaced apart from the stationary member by a distance.

16 Claims, 4 Drawing Sheets

(58) Field of Classification Search
CPC . G02B 7/04; G02B 7/08; G02B 27/64; G02B 27/644; G02B 27/646; H04N 5/2253; H02K 33/02
USPC ........ 359/554, 556, 557, 813, 814, 823, 824
See application file for complete search history.

(56) References Cited

U.S. PATENT DOCUMENTS

| | | | | |
|---|---|---|---|---|
| 2013/0039640 A1* | 2/2013 | Sekimoto | ............ | H04N 5/2257 396/55 |
| 2013/0050828 A1* | 2/2013 | Sato | ........................ | G02B 27/64 359/557 |
| 2015/0103195 A1* | 4/2015 | Kwon | .................. | H04N 5/2253 348/208.12 |
| 2016/0299312 A1* | 10/2016 | Cho | ......................... | G02B 7/08 |
| 2017/0315376 A1* | 11/2017 | Hu | ........................ | G02B 27/646 |

FOREIGN PATENT DOCUMENTS

| | | |
|---|---|---|
| CN | 104570547 A | 4/2015 |
| TW | 201436430 A | 9/2014 |
| TW | M505615 | 7/2015 |

\* cited by examiner

ELECTROMAGNETIC DRIVING MODULE AND LENS DRIVING DEVICE USING THE SAME

CROSS REFERENCE TO RELATED APPLICATIONS

This Application claims priority of Taiwan Patent Application No. 105103986, filed on Feb. 5, 2016, the entirety of which is incorporated by reference herein.

BACKGROUND

Field of the Invention

The present invention relates to a driving module and a lens driving device using the same, and more particularly to an electromagnetic driving module which converts electrical energy into mechanical energy, and a lens driving device using the same.

Description of the Related Art

Some electronic devices are equipped with a driving module to drive an element to move a predetermined distance. For example, a lens driving device usually includes a driving module to generate driving power. One or more optical lens units of the lens driving device are driven by the driving power to move along a direction perpendicular to an optical axis, so as to facilitate image stabilization.

However, since the driving module includes a complex driving member, such as a stepper motor, ultrasonic motor, piezoelectric actuator, etc. to generate the driving power, and the driving power has to be transmitted by a number of transmission elements, it is not easy to assemble and the manufacturing cost is high. In addition, a conventional driving module is also large in size and has a high power consumption due to its complex construction.

SUMMARY

In order to address the drawbacks in the prior art, one objective of the disclosure is to provide an electromagnetic driving module to stably drive the movement of an element (such as a lens assembly) in an electrical device.

In accordance with some embodiments of the disclosure, the electromagnetic driving assembly includes a stationary member, an OIS driving circuit, a movable member, and a protection member. The OIS driving coil is disposed on the stationary member. The movable member is disposed in the stationary member and includes a frame and a magnetic element. The frame surrounds a main axis. The magnetic element is disposed on the frame and faces the OIS driving coil in a direction that is parallel to the main axis. The protection element is disposed on a side of the magnetic element that is away from the main axis and is in contact with the magnetic element. In addition, in a direction that is perpendicular to the main axis, the protection element faces the stationary member and is spaced apart from the stationary member by a distance.

In the above-mentioned embodiments, the protection member includes a shielding portion which is plate-shaped, and an inner surface of the shielding portion which is in contact with the magnetic elements parallel to the main axis.

In the above-mentioned embodiments, the protection member may be made of magnetic material or resin material. Alternatively, the protection member may be made of metal material, and a portion of the protection member is embedded in the frame.

In the above-mentioned embodiments, the protection member includes a laying portion embedded in the frame; and a shielding portion, perpendicular to the laying portion and extending in a direction that is parallel to the main axis, wherein the shielding portion is exposed outside of the frame and is in contact with the magnetic element.

In the above-mentioned embodiments, a recess is formed on the frame, and the protection member comprises a shielding portion disposed in the recess. The distance between the shielding portion and the outer edge of the recess is shorter than the distance between the shielding portion and the inner edge of the recess, wherein the inner edge is closer to the main axis than the outer edge. In addition, the magnetic elements are disposed in the recess and disposed between the shielding portion and the inner edge.

In the above-mentioned embodiments, the stationary member includes a base and a housing. The OIS driving coil is disposed on the base. The housing is connected to the base. The movable member is disposed in a space defined by the base and the housing, and the protection member is spaced apart from the housing by a distance in a direction that is perpendicular to the main axis.

Another objective of the disclosure is to provide a lens driving device including the driving assembly in any one of the above-mentioned embodiments. The lens driving device further includes a lens assembly positioned on the movable member of the driving assembly. The optical axis of the lens assembly is aligned with the main axis.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

Figure 1:
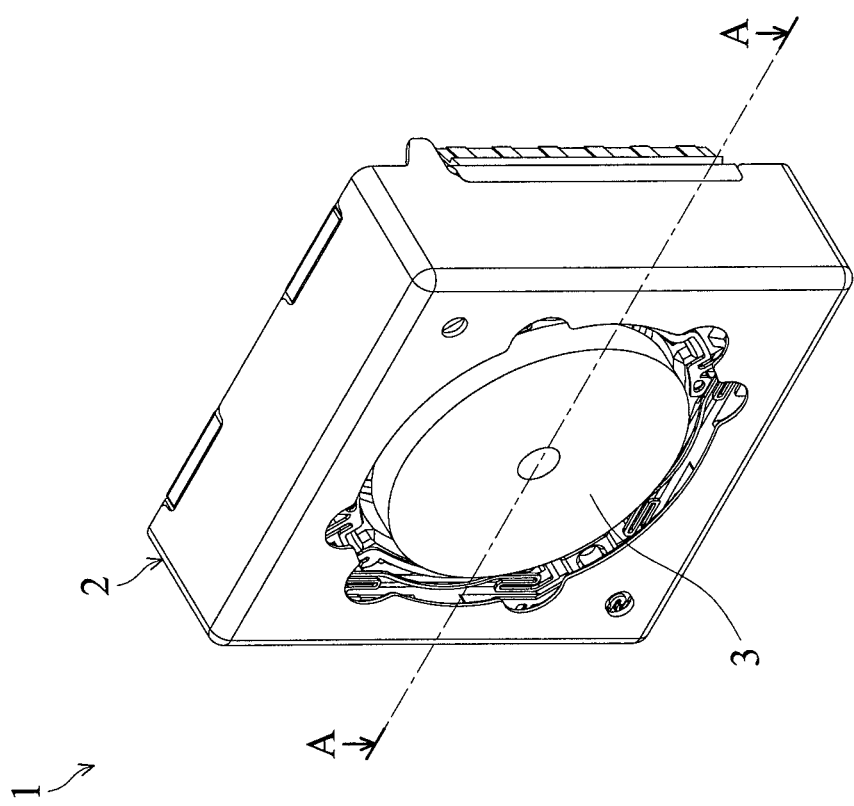
FIG. 1 shows a schematic view of a lens driving device, in accordance with some embodiments of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and " a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows a schematic view of a lens driving module 1. In some embodiments, the lens driving module 1 includes an electromagnetic driving module 2 and a lens assembly 3. The electromagnetic driving module 2 is configured to support the lens assembly 3 and to control the movement of the lens assembly 3.

Figure 2:
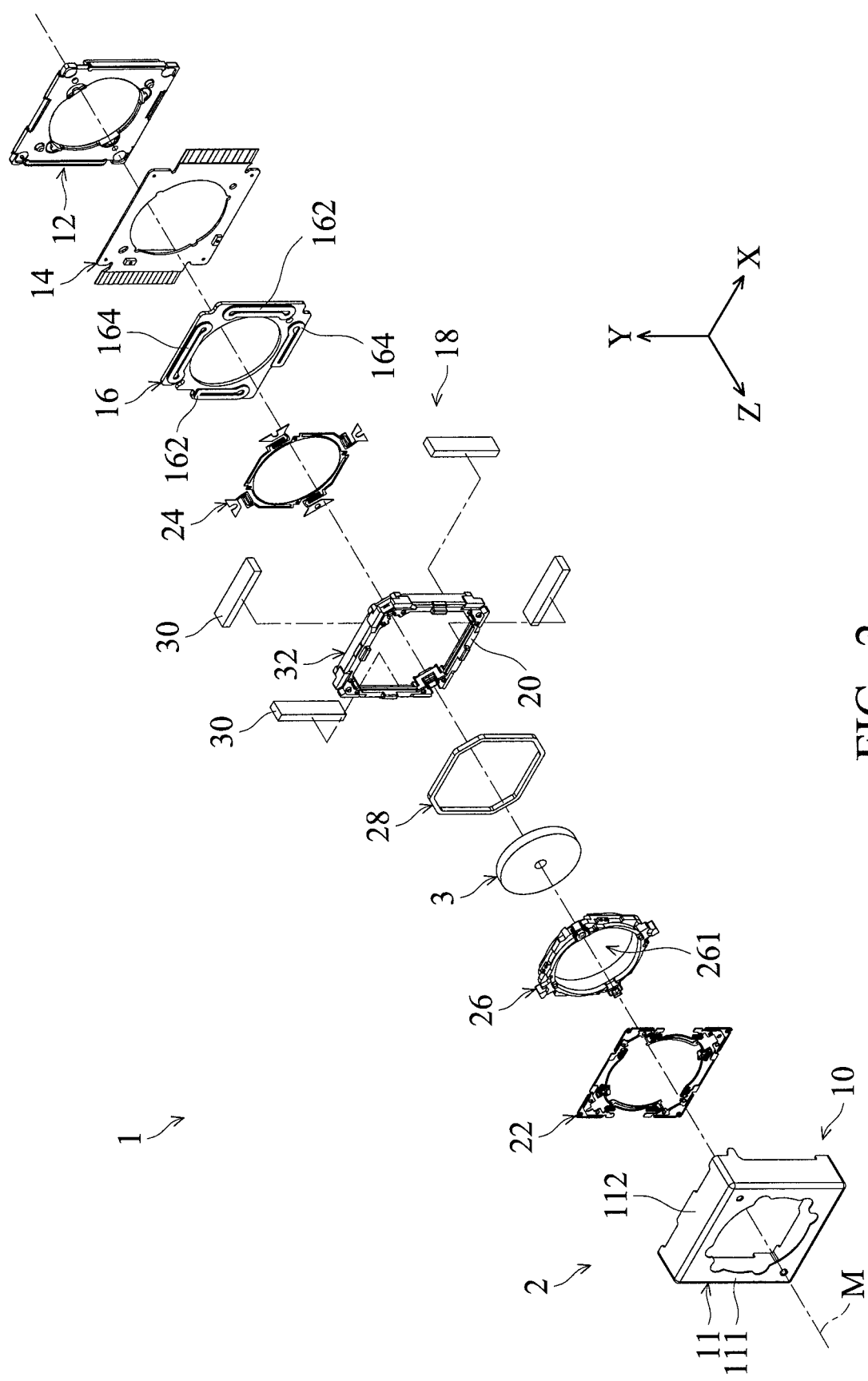
FIG. 2 shows an exploded view of an electromagnetic driving module, in accordance with some embodiments of the disclosure.

FIG. 2 shows an exploded view of an electromagnetic driving module, in accordance with some embodiments of the disclosure. In some embodiments, the electromagnetic driving module 2 includes a fixed portion 10, a circuit board 14, a coil substrate 16, a movable member 18, and a protection member 32. The elements of the electromagnetic driving module 2 can be added to or omitted, and the invention should not be limited by the embodiment.

In some embodiments, the fixed portion 10 includes a housing 11 and a base 12. In some embodiments, the housing 11 includes an upper housing member 111 and a lateral housing member 112. The upper housing member 111 has a rectangular shape. The lateral housing member 112 extends from the edges of the upper housing member 111 toward the base 12. The base 12 has a shape that corresponds to the shape of the upper housing member 111. The base 12 is connected to the housing 11 via the lateral housing member 112. The other elements of the electromagnetic driving module 2 may be positioned in a place defined by the housing 11.

The circuit board 14 is positioned on the base 12 and is configured to electrically connect a control module (not shown in figures) to the electric elements of the electromagnetic driving module 2. The coil substrate 16 is positioned on the circuit board 14 and includes a number of OIS (optical image stabilization) driving coils, such as two OIS driving coils 162 and two OIS driving coils 164. The OIS driving coils 162 and 164 are electrically connected to the circuit board 14 and are configured to drive the movement of the movable member 18 in a direction that is perpendicular to the main axis M. In some embodiments, as shown in FIG. 2, the two OIS driving coils 162 are respectively positioned adjacent to two lateral sides of the base 12 that are arranged along the X direction. In addition, the two OIS driving coils 164 are respectively positioned adjacent to two lateral sides of the base 12 that are arranged along the Y direction.

The movable member 18 is configured to support the lens assembly 3 to enable the moment of the lens assembly 3 relative to the base 12. In some embodiments, the movable member 18 includes a frame 20, an upper spring sheet 22, a lower spring sheet 24, a lens holder 26, a focusing driving coil 28, and a number of magnetic elements, such as four magnetic elements 30. The elements of the movable member 18 can be added to or omitted, and the invention should not be limited by the embodiment.

Figure 3:
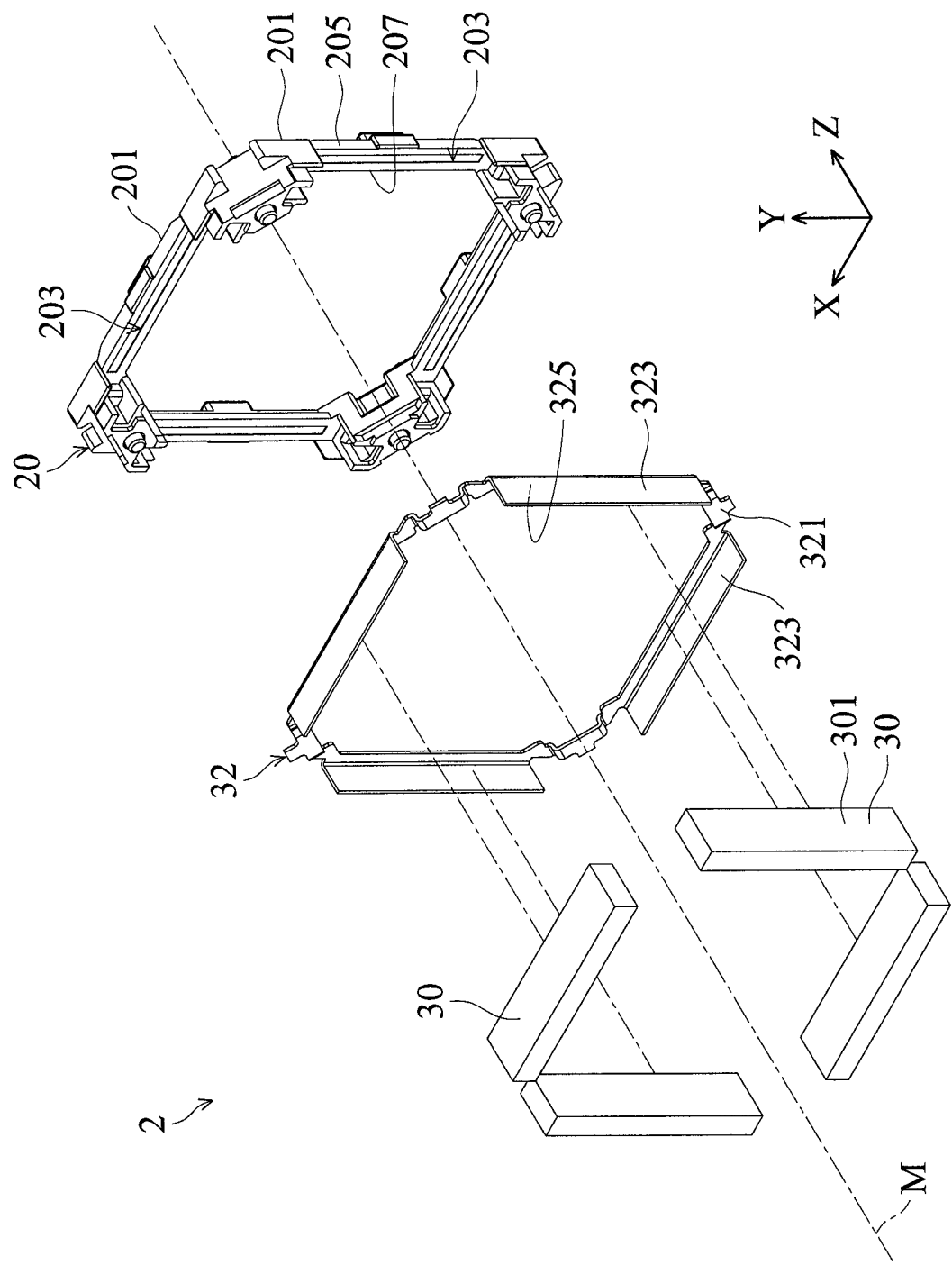
FIG. 3 shows an exploded view of a portion of elements of an electromagnetic driving module, in accordance with some embodiments of the disclosure.

Referring to FIG. 3, the frame 20 includes four lateral frame members 201 surrounding the main axis M and connected to one another. A recess 203 is formed on each of the lateral frame members 201. The recess 203 connects the inner surface 207 to the outer surface 205. The outer edge of the recess 203 is immediately connected to the outer surface 205, and the inner edge of the recess 203 is immediately connected to the inner surface 207. The lens holder 26 is surrounded by the frame 20, and the lens holder 26 is penetrated by a passage 261 that extend in the main axis M. The lens assembly 3 is disposed in the passage 261.

The upper spring sheet 22 and the lower spring sheet 24 are respectively fixed on the upper surface and the lower surface of the frame 20, and the lens holder 26 is disposed between the upper spring sheet 22 and the lower spring sheet 24. The upper spring sheet 22 and the lower spring sheet 24 are arranged so that the lens holder 26 can be driven to move relative to the stationary member 10 in a vertical direction (Z-axis direction.) The focusing driving coil 28 is disposed on the outer surface of the lens holder 26 and is electrically connected to the upper spring sheet 22 or the lower spring sheet 24.

In some embodiments, the movable member 18 is suspended over the base 12 by wiring lines (not shown in figures). Alternatively, the movable member 18 is disposed on the base 12 in a rollable manner via a number of rolling balls (not shown in figures).

Referring to FIG. 3, the protection member 32 is disposed on the frame 20 and configured to protect the magnetic elements 30. In some embodiments, the protection member 32 includes a laying portion 321 and a number of shielding portion, such as four shielding portions 323. The laying portion 321 is a rectangular circle and extends on a plane that is perpendicular to the main axis M. The four shielding portions 323 are connected to four lateral edges of the laying portion 321 and extend along a direction that is perpendicular to the laying portion 321 (i.e., a direction that is parallel to the main axis M). The width of each shielding portion 323 may be equal to or less than the width of the recess 203, and the height of each shielding portion 323 may be equal to or less than the depth of the recess 203. As a result, the surface of each magnetic element 30 that is away from the main axis M is entirely covered by the corresponding shielding portion 323.

The protection member 32 may be made of metal material or resin material. Alternatively, the shielding portion 323 may be made of magnetic material. In some embodiments, the protection member 32 is fabricated by punching one single plate member. As a result, the four shielding portions 323 have a flat configuration and uniform thickness.

During assembly, the laying portion 321 of the protection member 32 is embedded in the frame 20 by insert molding techniques, and the four shielding portions 323 are exposed outside of the frame 20 and located in the recesses 203. However, it should be appreciated that many variations and modifications can be made to embodiments of the disclosure. In some other embodiments, the laying portion 321 of the protection member 32 is omitted. The four shielding portions 323 are separated from each other. The bottom portion of each of the four shielding portions 323 is embedded in the frame 20, and the other portion of each of the four shielding portions 323 is exposed outside of the frame 20. In some other embodiments, the laying portion 321 of the protection member 32 is omitted. Each of the four shielding portions 323 is directly formed on an outer surface 301 of the corresponding magnetic element 30 that is away from the main axis M, and no contact is created between each shielding portion 323 and frame 20.

Figure 4:
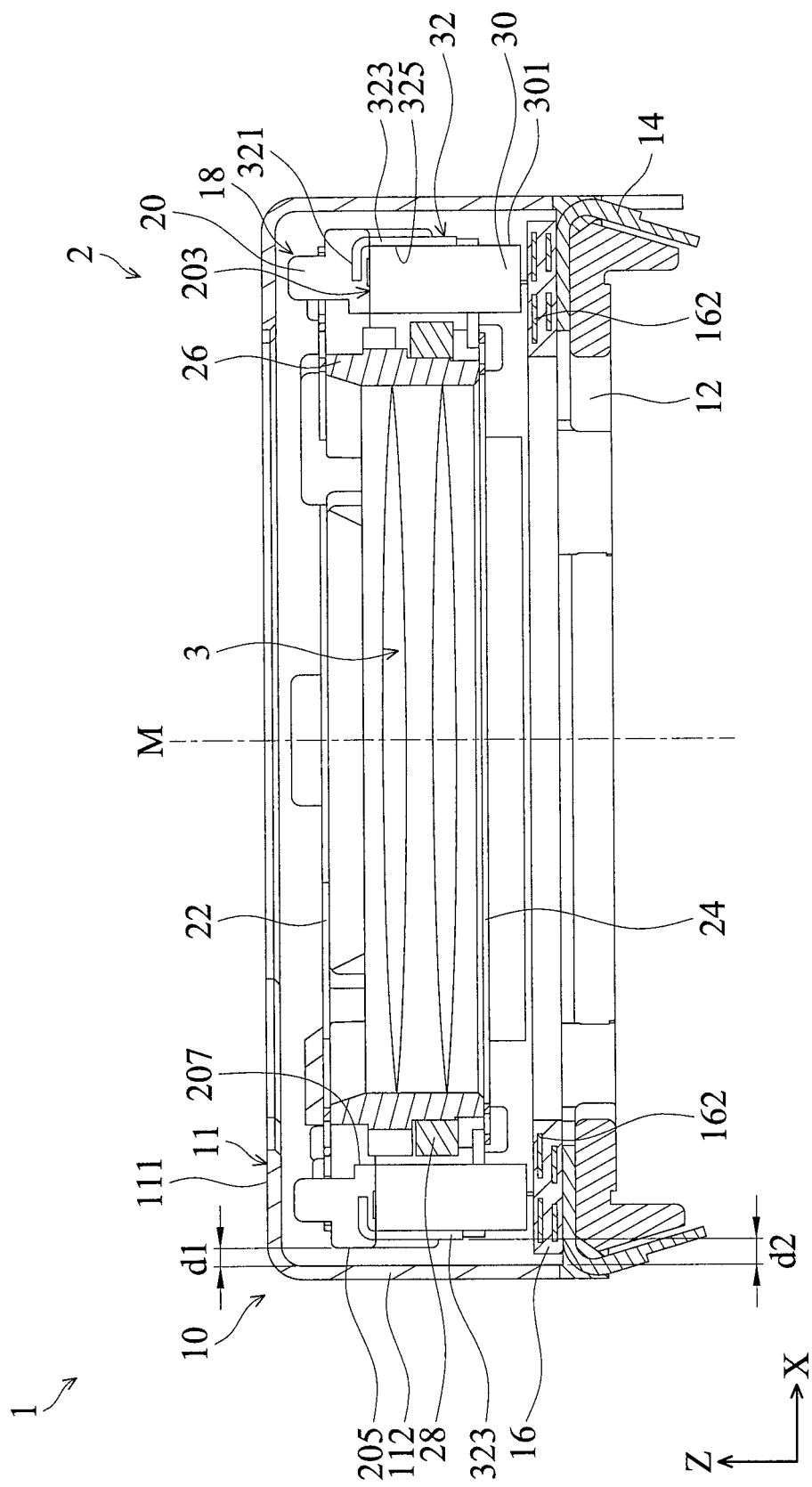
FIG. 4 shows a cross-sectional view of the electromagnetic driving module taken along line A-A' of FIG. 1.

FIG. 4 shows a cross-sectional view of the electromagnetic driving module taken along line A-A' of FIG. 1. In some embodiments, as shown in FIG. 4, there is a distance d1 defined between the lateral housing member 112 and the outer edge of the recess 203, and there is a distance d2 defined between the lateral housing member 112 and the shielding portion 323. The distance d1 is shorter than the distance d2. In some embodiments, the distance d1 is greater than 0 mm, and the distance d2 is smaller than 0.5 mm. With such arrangements, as collisions occurs, the outer surface 205 of the frame 20 may be in contact with the lateral housing member 112 of the housing 11, but contacts between the shielding portion 323 and the stationary member 10 can be prevented. However, it should be appreciated that many variations and modifications can be made to embodiments of the disclosure. In some other embodiments, the shielding portion 323 is flush with the outer surface 205 of the lateral frame members 201 (i.e., the distance d1=d2.)

Referring to FIGS. 3 and 4, the four magnetic elements 30 are respectively disposed in the recesses 203 of the lateral frame members 201. Being positioned by the frame 20, each of the four magnetic elements 30 faces the corresponding OIS driving coil 162 or 164 (only two OIS driving coils 162 are shown in FIG. 4). In addition, as each magnetic element 30 is disposed in the recess 203, the outer surface 301 of the magnetic element 30 that is away from the main axis M is in contact with the inner surface 325 of the shielding portion 323. In some embodiments, at least a region of outer surface 301 of the magnetic element 30 is covered by the inner surface 325 of the shielding portion 323.

The four magnetic elements 30 may be magnets. One magnetic pole of each magnetic element 30, such as the N pole, faces the lens holder 26, and the other magnetic pole of each magnetic element 30, such as the S pole, faces the shielding portion 323. The four magnetic elements 30 may be fixed on the recess 203 by any suitable method such as gluing. Alternatively, in cases where the protection member 32 is made of magnetic material, the four magnetic elements 30 are fixed on the protection member 32 by magnetic force.

Referring to FIG. 4, the operation method of the electromagnetic driving assembly 2 is described below.

When the electromagnetic driving module 2 is in operation, the control module (not shown in figures) transmits electric current to the OIS driving coils 162 and 164. The magnetic force produced between the OIS driving coils 162 and 164 and the magnetic elements 30 causes the movable member 18 to move in a direction that is perpendicular to the main axis M relative to the fixed portion 10 so as to keep the optical axis of the lens assembly 3 in alignment with the main axis M. In addition, to change the focusing position of the lens assembly 3, the control module (not shown in figures) transmits electric current to the focusing driving coil 28. Afterwards, the lens holder 26 is moved in the main axis M relative to the fixed portion 10 by the magnetic force produced between the focusing driving coils 28 and the magnetic elements 30.

During the operation of the electromagnetic driving module 2, one or more detection assemblies (not shown in the figures) are used to detect changes in the magnetic field of the driving magnets 26 and 27 and to produce electric signals to the control module (not shown in the figures) according to the detected result, so as to establish a closed-loop control.

It should be noted that, as an unexpected collision between the movable member 18 and the stationary member 10 occurs, the outer surfaces 301 of the magnetic elements 30 are protected by the shielding portions 323 of the protection member 32, and it is the protection member 32 that is hit by the stationary member 32 rather than the magnetic element 30. As a result, the magnetic element 30 is avoided from being dropped from the frame 20, and the reliability of the electromagnetic driving assembly 2 is improved.

In addition, with the arrangements of the protection member 32, the structural strength of the frame 20 is enhanced accordingly. Therefore, the portions of the frame 20 where the recess 203 is formed are prevented from being deformed as the electromagnetic driving module 2 is accidentally dropped. Since the magnetic elements 30 are stably disposed on the frame 20, the reliability of the electromagnetic driving assembly 2 is improved.

Moreover, during an event causing by a collision between magnetic element 30 and the stationary member 10, a notch may be formed on the magnetic element 30 or particles may be produced. However, these issues are prevented or avoided in the embodiments of the disclosure. For example, if the electromagnetic driving assembly 2 is dropped, the upper spring sheet 22 may oscillate fiercely. At the same time, the corner of the magnetic element 30 that is adjacent to the upper spring sheet 22 may collide with the housing 10, and particles may be produced. However, since the magnetic element 30 is covered by the protection member 32, the production of particles and damage to the magnetic element 30 can be prevented or avoided. Thus, the driving accuracy of the electromagnetic driving assembly 2 is increased.

In cases where the protection member 32 is made of magnetic material, the magnetic fields produced by the magnetic elements 30 cannot easily be interfered with by outer magnetic fields. Thus, a reduction of the driving accuracy of the electromagnetic driving assembly 2 due to an interference magnetic field is also prevented.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electromagnetic driving assembly, comprising:
a stationary member;

an optical image stabilization driving coil, disposed on the stationary member;
a movable member, disposed in the stationary member and comprising:
a frame, surrounding a main axis;
a focusing driving coil, disposed on the movable member; and
a magnetic element, disposed on the frame and facing the optical image stabilization driving coil and the focusing driving coil; and
a protection member, having a first surface and a second surface, the first surface and the second surface face opposite directions, and the protection member is disposed on a side of the magnetic element that is away from the main axis, wherein the first surface is in contact with the magnetic element and the second surface faces the frame; wherein the protection member is not disposed between the magnetic element and the optical image stabilization driving coil, wherein the protection member is not disposed between the magnetic element and the focusing driving coil; wherein the protection member does not move relative to the frame;
wherein in a direction that is perpendicular to the main axis, the protection member is spaced apart from the stationary member by a distance.

2. The electromagnetic driving assembly as claimed in claim 1, wherein the protection member comprises a shielding portion which is plate-shaped, and an inner surface of the shielding portion which is in contact with the magnetic element parallel to the main axis.

3. The electromagnetic driving assembly as claimed in claim 1, wherein the protection member is made of magnetic material.

4. The electromagnetic driving assembly as claimed in claim 1, wherein the protection member is made of metal material or resin material.

5. The electromagnetic driving assembly as claimed in claim 1, wherein the protection member is made of metal material, and a portion of the protection member is embedded in the frame.

6. The electromagnetic driving assembly as claimed in claim 1, wherein the protection member comprises:
a laying portion, embedded in the frame; and
a shielding portion, perpendicular to the laying portion and extending in a direction that is parallel to the main axis, wherein the shielding portion is exposed outside of the frame and is in contact with the magnetic element.

7. The electromagnetic driving assembly as claimed in claim 1, wherein the stationary member comprises a lateral housing member extending in a direction that is parallel to the main axis, and a recess is formed on the frame, and the protection member comprises a shielding portion disposed in the recess;
wherein a distance between the lateral housing member and an outer edge of the recess is shorter than a distance between the lateral housing member and the shielding portion.

8. The electromagnetic driving assembly as claimed in claim 7, wherein the magnetic element is disposed in the recess and disposed between the shielding portion and an inner edge of the recess, wherein the inner edge is closer to the main axis than the outer edge.

9. The electromagnetic driving assembly as claimed in claim 1, wherein the stationary member comprises:
a base, wherein the optical image stabilization driving coil is disposed on the base; and
a housing, connected to the base, wherein the movable member is disposed in a space defined by the base and the housing, and the protection member is spaced apart from the housing by a distance in a direction that is perpendicular to the main axis.

10. A lens driving device, comprising:
a stationary member;
an optical image stabilization driving coil, disposed on the stationary member;
a movable member, disposed in the stationary member and comprising:
a frame, surrounding a main axis;
a focusing driving coil, disposed on the movable member; and
a magnetic element, disposed on the frame and facing the optical image stabilization driving coil and the focusing driving coil; and
a protection member, having a first surface and a second surface, the first surface and the second surface face opposite directions, and the protection member is disposed on a side of the magnetic element that is away from the main axis, wherein the first surface is in contact with the magnetic element and the second surface faces the frame; wherein the protection member does not move relative to the frame; wherein in a direction that is perpendicular to the main axis, the protection member is spaced apart from the stationary member by a distance; and
a lens assembly positioned in the movable member, wherein the optical axis of the lens assembly is aligned with the main axis.

11. The lens driving device as claimed in claim 10, wherein the protection member is not disposed between the magnetic element and the optical image stabilization driving coil, wherein the protection member is not disposed between the magnetic element and the focusing driving coil.

12. The lens driving device as claimed in claim 10, wherein the protection member comprises a shielding portion which is plate-shaped, and an inner surface of the shielding portion which is in contact with the magnetic element parallel to the main axis.

13. The lens driving device as claimed in claim 10, wherein the protection member is made of magnetic material.

14. The lens driving device as claimed in claim 10, wherein the protection member is made of metal material or resin material.

15. The lens driving device as claimed in claim 10, wherein the protection member is made of metal material, and a portion of the protection member is embedded in the frame.

16. The lens driving device as claimed in claim 10, wherein the protection member comprises:
a laying portion, embedded in the frame; and
a shielding portion, perpendicular to the laying portion and extending in a direction that is parallel to the main axis, wherein the shielding portion is exposed outside of the frame and is in contact with the magnetic element.

* * * * *